(12) United States Patent
Jääskelä et al.

(10) Patent No.: US 9,720,546 B2
(45) Date of Patent: Aug. 1, 2017

(54) CALIBRATION OF A FORCE SENSITIVE DEVICE

(71) Applicant: Microsoft Technology Licensing, LLC, Redmond, WA (US)

(72) Inventors: Lauri Jääskelä, Tampere (FI); Henri Autio, Tampere (GB); Pasi Kemppinen, Tampere (FI); Petri Jarske, Tampere (FI); Matti Pellikka, Lempäälä (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 14/854,429

(22) Filed: Sep. 15, 2015

(65) Prior Publication Data

US 2017/0075489 A1    Mar. 16, 2017

(51) Int. Cl.
  *G06F 3/041* (2006.01)
  *G06F 3/044* (2006.01)
  *G06F 3/0354* (2013.01)

(52) U.S. Cl.
  CPC ........ *G06F 3/0418* (2013.01); *G06F 3/03545* (2013.01); *G06F 3/044* (2013.01); *G06F 3/0412* (2013.01); *G06F 2203/04105* (2013.01)

(58) Field of Classification Search
  CPC .. G06F 3/0418; G06F 3/03545; G06F 3/0416; G06F 3/0414
  See application file for complete search history.

(56) References Cited

U.S. PATENT DOCUMENTS

| | | |
|---|---|---|
| 5,117,071 A | 5/1992 | Greanias et al. |
| 5,231,381 A | 7/1993 | Duwaer |
| 5,248,855 A | 9/1993 | Cambridge |
| 5,376,948 A | 12/1994 | Roberts |
| 6,977,646 B1 | 12/2005 | Hauck et al. |

(Continued)

FOREIGN PATENT DOCUMENTS

| | | |
|---|---|---|
| EP | 2677291 A1 | 12/2013 |
| EP | 2899635 A1 | 7/2015 |
| WO | 2015027017 A1 | 2/2015 |

OTHER PUBLICATIONS

Rodriguez, Rick, "Microsoft Addresses N-Trig concerns in Reddit Response", Published on: May 27, 2014 Available at: http://surfaceproartist.com/blog/2014/5/27/microsoft-addresses-n-trig-concerns-in-reddit-response.

(Continued)

*Primary Examiner* — Kevin M Nguyen

(57) ABSTRACT

A force sensitive surface measures force or pressure applied to the surface. The surface may also detect the touch position. The force sensing surface is calibrated with a stylus having a force measuring element. The stylus measures the force information from force applied on the surface and sends the information to the device with the force sensing surface. The device detects the same force and calibrates the force sensing element according to the information received from the stylus. The device may also detect the position of the touch. As the force information obtained from different portions of the surface may be different, the calibration may be repeated for multiple positions on the force and touch sensitive surface. The calibration may also be used to calibrate a position sensing feature on a force sensing surface having multiple force sensors.

20 Claims, 4 Drawing Sheets

(56) References Cited

U.S. PATENT DOCUMENTS

| | | |
|---|---|---|
| 7,158,122 B2 | 1/2007 | Roberts |
| 7,511,702 B2 | 3/2009 | Hotelling |
| 8,928,635 B2 | 1/2015 | Harley et al. |
| 2003/0214485 A1 | 11/2003 | Roberts |
| 2006/0007186 A1 | 1/2006 | Homer et al. |
| 2010/0051356 A1* | 3/2010 | Stern .................. G06F 3/03545 178/19.04 |
| 2011/0157087 A1* | 6/2011 | Kanehira .............. G06F 3/0414 345/174 |
| 2011/0260983 A1 | 10/2011 | Pertuit et al. |
| 2012/0062499 A1 | 3/2012 | Weaver et al. |
| 2012/0154340 A1 | 6/2012 | Vuppu et al. |
| 2013/0106718 A1 | 5/2013 | Sundara-Rajan |
| 2014/0002422 A1 | 1/2014 | Stern et al. |
| 2015/0277587 A1* | 10/2015 | Chandran ............. G06F 3/0416 345/173 |

OTHER PUBLICATIONS

"International Search Report and Written Opinion Issued in PCT Application No. PCT/US2016/045667", Mailed Date: Oct. 24, 2016, 11 Pages.

* cited by examiner

CALIBRATION OF A FORCE SENSITIVE DEVICE

BACKGROUND

Touch sensitive displays are a well-known solution for user interfaces. The display senses the position of a touch on the screen. Additional features may be utilized in the user interface, when the display detects the force of the touch—for example the user may apply more force against the display to increase a displayed value on the screen. Different portions of the display may provide different force information to equal forces. A display having both touch and force sensing features may require calibration during the initial startup or periodically during the use of the device. The embodiments described below are not limited to implementations which solve any or all of the disadvantages of known displays with force sensors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A force sensitive surface measures force or pressure applied to the surface. The surface may also detect the touch position. The force sensing surface is calibrated with a stylus having a force measuring element. The stylus measures the force information from force applied on the surface and sends the information to the device with the force sensing surface. The device detects the same force and calibrates the force sensing element according to the information received from the stylus. The device may also detect the position of the touch. As the force information obtained from different portions of the surface may be different, the calibration may be repeated for multiple positions on the force and touch sensitive surface. The surface may be calibrated to provide equal force values independent of the touch location. The calibration may also be used to calibrate a position sensing feature on a force sensing surface having multiple force sensors. Also, providing rough location estimate based on force measurement values may require calibration.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present embodiments and is not intended to represent the only forms in which the present embodiments may be constructed or utilized. However, the same or equivalent functions and sequences may be accomplished by different embodiments.

Although the present embodiments are described and illustrated herein as being implemented in a smartphone, the device described is provided as an example and not a limitation. As those skilled in the art will appreciate, the present embodiments are suitable for application in a variety of different types of mobile and/or hand-held apparatuses, e.g. in tablets, smart watches, laptops or gaming consoles. Force sensing may be used in various applications and apparatuses with a display. The display may be a peripheral connected to a system, wherein at least a portion of the user interface is configured to the display. In one embodiment the display is arranged inside a car, wherein the driver or passenger may operate the display with force sensing feature.

Figure 1:
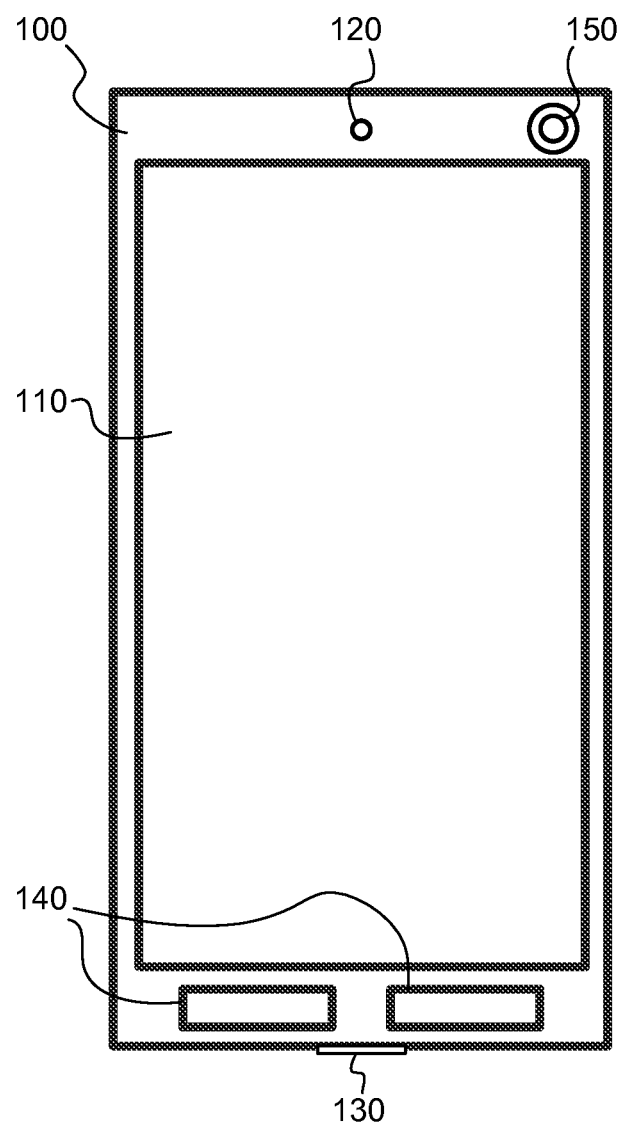
FIG. 1 illustrates a device according to an embodiment.

FIG. 1 illustrates a device according to an embodiment, wherein the device is a smartphone. The device comprises a body 100 comprising a display 110, a speaker 120, a microphone 130, keys 140 and a camera 150. The device comprises at least one processor and at least one memory including computer program code for one or more programs. The at least one memory and the computer program code are configured, with the at least one processor, to cause the apparatus to perform at least the functionality described herein. The system described hereinafter may comprise a portion of the portable device, its components and/or peripherals connected to the portable device.

Figure 2:
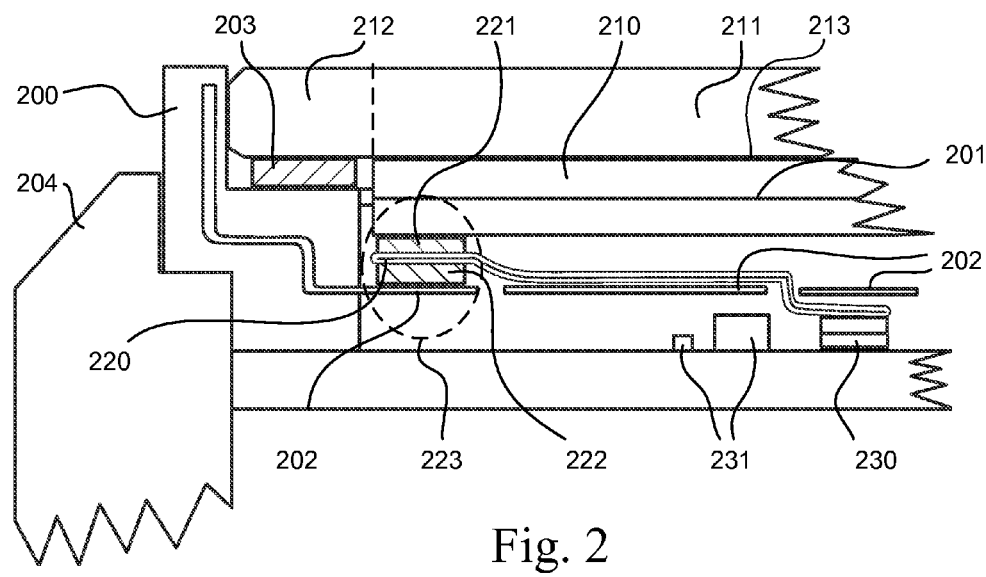
FIG. 2 illustrates a cross-sectional view of one device with a display.

FIG. 2 illustrates a cross-sectional view of a device with a display, wherein a portion of the structure is shown. In this embodiment the device is a smartphone. A device body may comprise different constructions. In one embodiment the body is a unibody design, wherein the body consists of a single shell that is the principal source of structural strength and is configured to carry the components. In one embodiment the body comprises multiple parts, wherein the structural strength and component placement is carried out by different parts of the body. In the embodiment of FIG. 2 the device body comprises a display frame 200 and a cover structure 204. A display 210 is visible under a cover glass 211. The display 210 may be attached to the display frame 200. The cover glass 211 protects the display from external elements, such as moisture or mechanical damage. In one embodiment the display 210 is attached to the cover glass 211 with a transparent adhesive 213. The cover glass 211 is made of durable transparent material that may comprise a coating made of another material, not limiting the cover glass material to glass. In this context, directions such as "top", "higher" or "up" relate to the visible side of the display 210; and "bottom", "lower" or "down" relate to the side of the display 210 that is attached to the device.

A portion 212 of the cover glass 211 extends over the edges of the display 210. An adhesive 203 attaches the cover glass 211 to the display frame 200 from the cover glass portion 212. An adhesive 203 attaches the cover glass 211 to the display frame 200. The outer cover structure 204 is configured to provide rigidity to the device and protection on the outer edges of the device. The cover structure 204 may be openable by the user. Various cover structure 204 arrangements are possible without affecting the functionality of the force sensing. As the cover glass 211 is attached to the display 210, the adhesive 203 attaches the display 210 to the display frame 200 from the cover glass portion 212. In one embodiment the display is an OLED display (OLED, Organic Light-Emitting Diode). The display 210 comprises a first conductive layer 201 that provides a reference voltage. The first conductive layer 201 may be a common voltage layer, configured to comprise a single function, such as a VCOM layer for the display or a guard electrode layer for the touch sensing if the display is configured to sense touch. In one embodiment the first conductive layer 201 comprises two functions, a VCOM layer for the display mode and a guard electrode layer for the touch sensing mode, wherein the modes are configured to alternate according to the function.

A second conductive layer 202 is configured on the display frame 200 to provide a reference voltage. In an embodiment, both the first conductive layer 201 and the second conductive layer 202 provide the same reference voltage. The reference voltage may be a ground voltage, a device chassis voltage, a phone chassis voltage or a floating ground, wherein the grounding may be provided through the user holding the display frame 200 of the device. The reference voltage may also be other predefined voltage level provided to the first conductive layer 201 and/or to the second conductive layer 202 by a measurement circuit. A sensor layer 220 is positioned between the first conductive layer 201 and the second conductive layer 202. A first dielectric layer 221 provides a distance between the first conductive layer 201 and the sensor layer 220, and a second dielectric layer 222 provides a distance between the second conductive layer 202 and the sensor layer 220. The sensor layer 220 is configured to detect capacitance between the reference voltage and the sensor layer 220. For example, a charge is induced on the sensor layer 220 and the capacitance measurement circuitry produces a voltage signal or the reference voltage for the first conductive layer 201 or the second conductive layer 202.

At least one of the first dielectric layer 221 and the second dielectric layer 222 is made of compressible material configured to compress due to a force applied to the display. The sensor layer 220 may only cover a portion of the display area, wherein the sensor area detects the movement of the display 210. One example of the movement is the display 210 bending towards the sensor layer 220 as a response to the user applying force to the display 210 or pressing the display 210. In one example the display 210 moves sideways as the adhesive 203 and/or the adhesive layer 213 may allow lateral flex to the display 210 in relation to the sensor layer 220. The compressible material may be made of foam or elastic material such as rubber or a gel-like material. In one embodiment the compressible material is foam. In one embodiment the foam is made of polyolefin and polyester. The foam may be used to cushion the display 210 against damage. The positioning of the sensor layer 220 and the foam layers 221, 222 in the area 223 under the display 210 provides more leverage to detecting the force from the display when compared to sensors positioned close to the edge of the cover glass 212. The compressible material 221, 222 has at least two purposes: cushioning the display and providing distance from the sensor layer 220 to the first conductive layer 201 and the second conductive layer 202.

In one embodiment the foam thickness may be between 0.05 mm to 0.2 mm. In one embodiment the foam thickness may be about 0.1 mm. The foam may compress up to 20% of the original thickness. In one embodiment the foam is supersoft foam.

A capacitive force sensor detects the changes in the capacitance from the sensor layer 220 against the reference voltage present at the first conductive layer 201 and the second conductive layer 202. In one embodiment the first conductive layer 201 is configured to the lower surface of the display 210, under the display 210. In one embodiment the first conductive layer 201 is configured to the areas near the edge of the display 210, wherein the layer may be made of a grounded copper tape, a printed conductive area or an ITO area on the lower surface of the cover glass 211. The change in the capacitance detected at the sensor layer 220 is proportional to the variable distance between the first conductive layer 201 and the sensor layer 220. When the user applies force to the cover glass 211, for example by pressing it with a finger, the cover glass 211 moves slightly. The movement of the cover glass 211 causes the display 210 to move as well, whereby the distance between the first conductive layer 201 and the sensor layer 220 is temporarily reduced. The display 210 may also move sideways due to the flexibility of the adhesive material 213. When the user releases the force applied to the cover glass 211, the structure retains its original form and the original distance between the first conductive layer 201 and the sensor layer 220. Variable background capacitance or parasitic capacitance could create unreliable results for measuring the capacitance; therefore, the sensor layer 220 is sandwiched between two layers both the reference voltage. The reference voltage may be the same for the first conductive layer 201 and the second conductive layer 202 or the layers 201, 202 may have different reference voltages. The reference voltage is kept constant over a long period of time. This configuration reduces the effect of background capacitance or parasitic capacitance and the capacitive measurement from the sensor layer 220 focuses to detecting movement of reference layers 201, 202. In one embodiment the backside of the device moves, causing the second conductive layer 202 to move closer to the sensor layer 220 or in relation to the sensor layer 220. The configuration senses the force applied on the backside of the device. In an embodiment, both sides of the device move, causing measurement of the force applied to the surface of both sides of the device.

In one embodiment the first dielectric layer 221 is made of compressible material and the second dielectric layer 222 is made of solid material. The solid material in this context refers to a material that is not compressible in the measurement range of the force applied by a human finger to a portable device. In one embodiment the first dielectric layer 221 is made of solid material and the second dielectric layer 222 is made of compressible material. These embodiments may be used to differentiate the detection range of the force applied to the device surface. In one embodiment the sensor layer 220 detects the battery swell, as the swelling battery may alter the distance between the sensor layer 220 and the first conductive layer 201 or the second conductive layer 202.

The sensor layer 220 is in one embodiment configured as a conductor inside an insulating layer. In one embodiment the sensor layer 220 comprises a flat polyamide-copper-polyamide configuration with a flat structure. In one embodiment the conductor inside the sensor layer 220 extends to a force detecting element 230 through via holes in the second conductive layer 202. The second conductive layer 202 may extend to the sides on the device, providing further protection to force sensing elements. In one embodiment the second conductive layer 202 extending to the sides may be used to detect force sensing from the sides of the device.

In an embodiment the device comprises at least one processor 231 and a memory storing instructions that, when executed, cause the device to transform the capacitance detected from the sensor layer 220 to correspond to the force applied to the display 210. The device comprises a force detecting element 230 that is connected to the conductor extending from the sensor layer 220. The force detecting element 230 detects the voltage received from the sensor layer 220 and transforms the voltage information to force information. The force detecting element 230 may be implemented partially by the operating system of the portable device; it may be implemented by hardware or partially by hardware and partially by embedded software. In an embodiment the software or a part of the software is configured in a cloud computing environment and at least a portion of the software is executed in the cloud computing environment. In one embodiment the force detecting element 230 and the at least one processor 231 are integrated as a single component. In one embodiment the force detecting element is configured to detect the position of a touch on the display.

In an embodiment the at least one processor and the memory storing instructions cause, when executing the instructions, the device to calibrate a sensor at the sensor layer by moving a predefined measurement range between a minimum capacitance value and a maximum capacitance value. The measurement range may be 40 pF that is moved inside the value range detectable by the force detecting element 230. The measurement range and the measurement resolution may vary according to the embodiment or according to the design of the capacitance measurement circuit.

Figure 3:
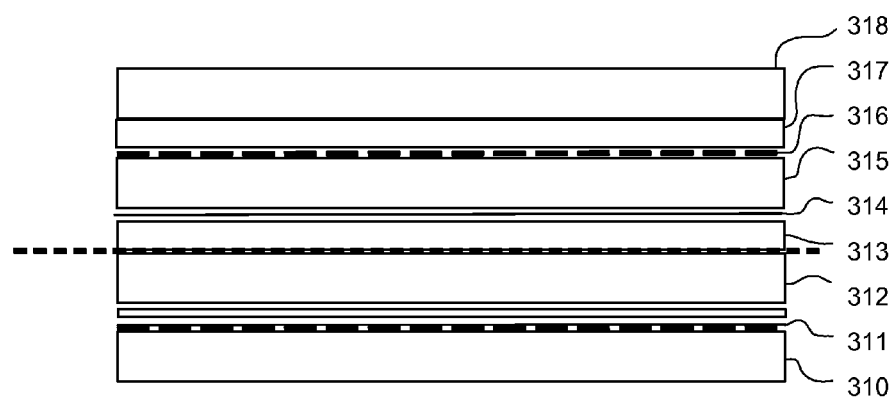
FIG. 3 illustrates one embodiment of a display stack.

FIG. 3 illustrates one embodiment of a display stack. An array glass 310 forms the bottom layer of the display stack. The display panel 311 may be a LCD panel, a LED, an OLED, an AMOLED panel or any means for presenting an image, wherein the first conductive layer is sufficiently stiff to move according to the display. The display may be configured to detect touch with a capacitive sensor. A display driver operates and controls the display panel 311. The display driver may be a separate integrated circuit connected to the display panel 311. On top of the display panel 311 there is a color filter 312 that may be made of glass. Display functions are arranged on the lower portion of the display stack and touch functions are arranged on the upper portion. An adhesive layer 313 connects the color filter 312 and a guard layer 314 used for sensing touch. In this arrangement a touch sensor substrate 315 separates the self-capacitance sensing layers, the lower guard layer 314 and an upper electrode layer 316. The electrode layer 316 may comprise multiple sensors on the same layer according to the desired touch sensing resolution. Electrodes may be arranged in an array and they may be square or any other shape in two dimensions on the electrode layer 316. A touch control 320 is connected to the guard layer 314 and the electrode layer 316. A cover glass 318 forms the top layer. It is connected to the electrode layer 316 and to the touch sensor substrate layer 315 with an adhesive layer 317. The cover glass 318 may be made of glass or any other suitable transparent and durable material.

Figure 4:
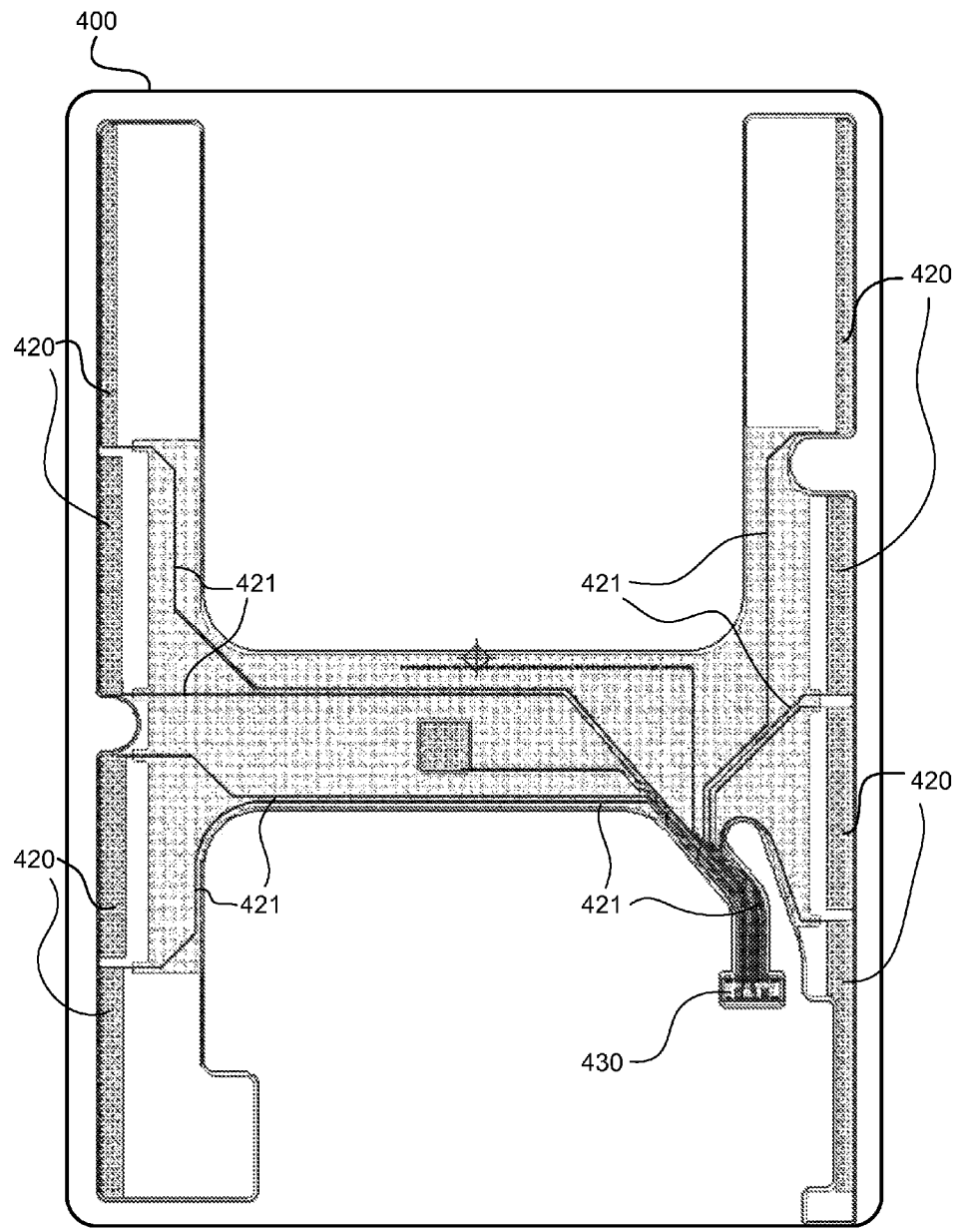
FIG. 4 illustrates one embodiment of the sensor layer placement on the device.

FIG. 4 illustrates one embodiment of the sensor layer placement on the device. In one embodiment the device comprises a plurality of sensors 420 at the sensor layer. The sensors 420 may detect the capacitance from the first conductive layer and/or the second conductive layer. The sensors 420 may also comprise dummy sensor lines configured to detect environmental effects that differ from the capacitive movement measurement. These environmental effects may be filtered from the capacitance detected from the sensors arranged on the sensor layer. The sensors 420 may be located near the corners of the device body 400. Conductors 421 conduct the sensor information to a force sensing element 430. The force sensing element 430 may be configured on the same layer as the sensors 420 or it may be configured on another layer on the body 400, wherein the component 430 provides a connector to the force sensing element. When the user applies force to the display, the plurality of sensors 420 in the sensor layer detect different values as the leverage of the moving display affects sensors 420 at each corner in a different manner. The at least one processor and the memory storing instructions cause, when executing the instructions, the device to detect the position of the force applied to the display according to the difference detected from different sensors 420. The display may also comprise a touch detecting function, wherein the information from the touch detecting element may be used with the force sensing element. In one embodiment the force sensing element detects the position of the touch when the display is off. This feature may save battery charge on the device. In one embodiment, compressible material is used for cushioning the display in some areas without having the sensor element 420 in between.

Figure 5:
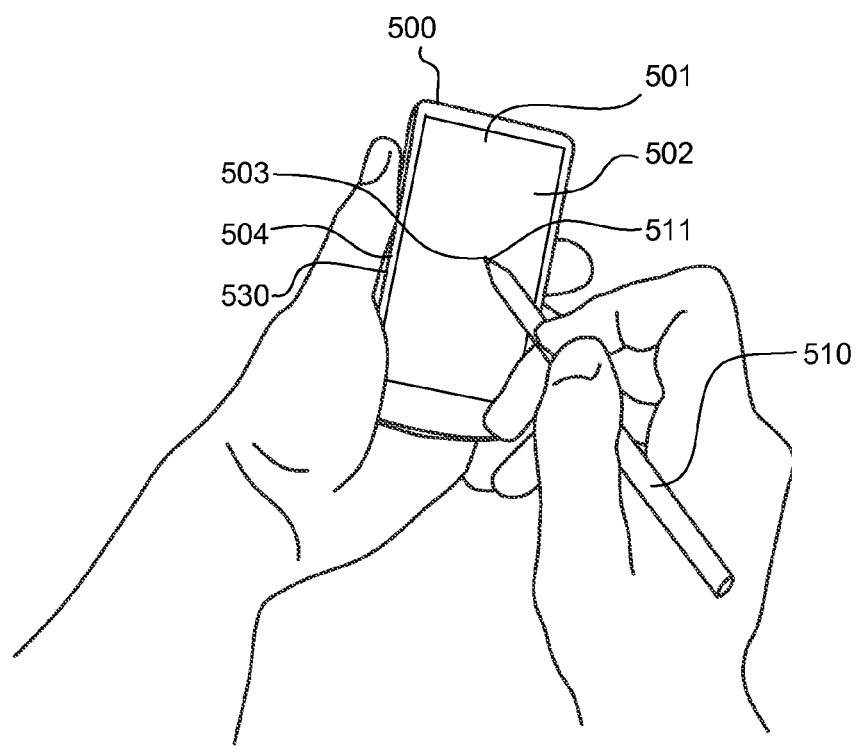
FIG. 5 illustrates one embodiment of a device with a stylus.

FIG. 5 illustrates one embodiment of the force sensor calibration. A user is holding a device 500 comprising a force sensitive area 501 and a force detecting element 530. In this example the device 500 is a smartphone, wherein the force sensitive area 501 and the force detecting element 530 are configured in a display 502. The display 502 is configured to detect a position 503 of an object 510 touching the force sensitive area 501 and a force applied by the object touching the force sensitive area 501. In this example the object 510 is a stylus that the user is operating on the display of the smartphone 500. In one embodiment the force sensitive area 501 comprises a touch sensitive area, wherein the touch sensitive area detects the touch without differentiating the force applied to the surface. The touch sensitive area comprises elements described hereinbefore, wherein the touch sensor and the force sensor are separate elements configured to sense different functions.

The stylus 510 is an active stylus, having a force measurement element 511 and an interface 520 for communicating with the device 500. The device 500 also comprises an interface 504 for communicating with the stylus 510, in an embodiment the interface is a wireless interface configured for near field communication. In one embodiment the device 500 and the stylus 510 communicate during the contact, wherein the display is on the signal path.

The stylus 510 detects the force applied to the display 502 and transmits it via the interface 504, 520 to the device 500. The device 500 detects the position 503 of the touch and the force applied to the display 502 from the stylus 510. The device compares the force information received from the stylus 510 and the force information detected from the display 502, wherein the difference is stored to a memory. The device 500 calibrates the force information received from the display 502, for example storing the difference with the position 503 of the measurement. When the device detects force applied to the position 503, it adds the difference to the detected force information to correct the result. In one embodiment the force sensor operation is not linear and the difference is multiplied with a coefficient before adding to the detected force information. In one embodiment the device 500 stores a transfer function and the position 503, wherein the transfer function causes the detected force information to transfer into the measured force information.

In one embodiment the memory of the device comprises a calibration table. The calibration table may comprise different positions of the force sensitive area with the information for correcting the detected force information. The calibration process may comprise a step, wherein the user is prompted to touch the display 502 with the stylus 510 from multiple predefined positions that may be highlighted on the display 502. For example, the user may be prompted to draw a figure on a visual cue displayed on the display 502. The calibration table may comprise several nonlinear calibration results, coefficients and/or transfer functions. The correction for at least one portion of the force sensitive area may be obtained by interpolating between calibrated positions.

In an embodiment the force measurement element on the tip of the stylus 510 may be a capacitive force sensor or for example a sensor based on a spring action. The measurement element may be an expanding tip, wherein the stylus 510 tip expands according to the force applied to the display 502. The expansion may be predefined and the transfer function between the force applied to the object and the expansion of the stylus 510 tip may be known. The touch sensitive area may detect the surface area of the contact 504 and calculate the force applied to the display 502 as a function of contacted surface area.

In one embodiment the two measurements are used to calibrate the stylus 510. For example, the force sensitive area may be calibrated and a new stylus 510 is introduced. The calibrated force measurement information is used to calibrate the force information provided by the new stylus 510.

One aspect discloses a device, comprising a force sensitive area configured to detect a position of an object touching the force sensitive area and a force applied by the object touching the force sensitive area; at least one processor and a memory storing instructions that, when executed, are configured to cause: an interface to receive from the object a force information of the touch; and a force detecting element to compare the force information received from the object and the force information detected from the force sensitive area; wherein based on the comparison the force detecting element is configured to calibrate the force information detected from the force sensitive area. One aspect discloses a device, comprising: a touch sensitive area configured to detect a position of an object touching the touch sensitive area and a force applied by the object touching the touch sensitive area; at least one processor and a memory storing instructions that, when executed, are configured to cause: an interface to receive from the object a force information of the touch; and a force detecting element to compare the force information received from the object and the force information detected from the touch sensitive area; wherein based on the comparison the force detecting element is configured to calibrate the force information detected from the touch sensitive area. The object is in one embodiment a stylus. In one embodiment the object is an active stylus. In one embodiment the device comprises a body, a display having a cover glass extending over the edges of the display, wherein the touch sensitive area is configured to the display; an adhesive configured to attach the display to the body from the cover glass portion, a first conductive layer on the display configured to provide a reference voltage, a second conductive layer on the body configured to provide a reference voltage, a sensor layer configured to detect capacitance between the reference voltage and the sensor layer, a first dielectric layer configured to provide a distance between the first conductive layer and the sensor layer, a second dielectric layer configured to provide a distance between the second conductive layer and the sensor layer; wherein at least one of the first dielectric layer and the second dielectric layer is made of compressible material configured to compress due to a force applied to the display; and the force detecting element configured to transform the capacitance detected from the sensor layer to correspond to the force applied to the display. In one embodiment the device comprises a plurality of sensors at the sensor layer, wherein the at least one processor and the memory storing instructions cause, when executing the instructions, the device to detect the position of the force applied to the display. In one embodiment the interface is configured to transfer information during the connection of the object and the touch sensitive area. In one embodiment the interface is configured to transfer information during the connection of the object and the force sensitive area. In one embodiment the object is a stylus comprising a force measurement element. In one embodiment the interface is a wireless interface. In one embodiment the interface is configured to transfer information during the connection of the object and the touch sensitive area through the touch sensitive area. In one embodiment the force sensitive area comprises a touch sensitive area. In one embodiment the point of the object touching the touch sensitive area is configured to expand according to the force applied to the touch sensitive area and the touch sensitive area is configured to detect the area of the object touching the touch sensitive area, wherein the expansion is proportional to the force applied to the touch sensitive area. In one embodiment the device is configured to transmit the force information detected from the touch sensitive area to the object.

One aspect discloses a system, comprising a device comprising a force sensitive area configured to detect a position of an object touching the force sensitive area and a force applied by the object touching the force sensitive area; a stylus configured to touch the force sensitive area and to detect the force applied on the force sensitive area; wherein the stylus is configured to transmit the force information to the device; and the device comprising a force detecting element configured to compare the force information received from the stylus and the force information detected from the force sensitive area; wherein based on the comparison the force detecting element is configured to calibrate the force information detected from the force sensitive area. One aspect discloses a system, comprising: a device comprising a touch sensitive area configured to detect a position of an object touching the touch sensitive area and a force applied by the object touching the touch sensitive area; a stylus configured to touch the touch sensitive area and to detect the force applied on the touch sensitive area; wherein the stylus is configured to transmit the force information to the device; and the device comprising a force detecting element configured to compare the force information received from the stylus and the force information detected from the touch sensitive area; wherein based on the comparison the force detecting element is configured to calibrate the force information detected from the touch sensitive area. In one embodiment of the system the device comprises a body, a display having a cover glass extending over the edges of the display, wherein the touch sensitive area is configured to the display; an adhesive configured to attach the display to the body from the cover glass portion, a first conductive layer on the display configured to provide a reference voltage, a second conductive layer on the body configured to provide a reference voltage, a sensor layer configured to detect capacitance between the reference voltage and the sensor layer, a first dielectric layer configured to provide a distance between the first conductive layer and the sensor layer, a second dielectric layer configured to provide a distance between the second conductive layer and the sensor layer; wherein at least one of the first dielectric layer and the second dielectric layer is made of compressible material configured to compress due to a force applied to the display; and the force detecting element configured to transform the capacitance detected from the sensor layer to correspond to the force applied to the display. In one embodiment the force detecting element is configured to detect the position of the force applied to the display. In one embodiment the stylus comprises a force measurement element. In one embodiment the device and the stylus comprise a wireless interface to transmit and receive the force information. In one embodiment the device is configured to transmit the force information detected from the touch sensitive area or from the force sensitive area to the stylus through the force sensitive area. In one embodiment a point of the stylus touching the touch sensitive area is configured to expand according to the force applied to the touch sensitive area and the touch sensitive area is configured to detect the area of the object touching the touch sensitive area, wherein the expansion is proportional to the force applied to the touch sensitive area. In one embodiment the device is configured to transmit the force information detected from the touch sensitive area or from the force sensitive area to the object.

One aspect discloses a method, wherein a device comprises a force sensitive area detecting a position of an object touching the force sensitive area and a force applied by the object touching the force sensitive area; detecting the force applied on the force sensitive area and transmitting the force information from the object to the device; comparing the force information received from the object and the force information detected from the force sensitive area; and calibrating the force information detected from the force sensitive area. In an embodiment the device comprises a body, a display having a cover glass extending over the edges of the display, wherein a touch sensitive area is configured to the display; an adhesive attaching the display to the body from the cover glass portion, wherein the method comprises a first conductive layer on the display providing a reference voltage, a second conductive layer on the body providing a reference voltage, a sensor layer detecting capacitance between the reference voltage and the sensor layer, a first dielectric layer providing a distance between the first conductive layer and the sensor layer, a second dielectric layer providing a distance between the second conductive layer and the sensor layer; wherein applying a force to the display causing at least one of the first dielectric layer and the second dielectric layer compressing due to the force applied to the display; and transforming the capacitance detected from the sensor layer to correspond to the force applied to the display. In one embodiment the method comprises detecting the position of the force applied to the display Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the force detection element functionality may be performed by one or more hardware logic components.

An example of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to configure the device for a particular user. In an embodiment the display device may also act as the user input device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network).

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
a force sensitive area configured to detect a position of an object touching the force sensitive area and a force applied by the object touching the force sensitive area;
at least one processor and a memory storing instructions that, when executed, are configured to cause:
an interface to receive from the object force information of the touch; and
a force detecting element to compare the force information received from the object and the force information detected from the force sensitive area;
wherein based on the comparison the force detecting element is configured to calibrate the force information detected from the force sensitive area, wherein the object is external to the force sensitive area.

2. A device according to claim 1, comprising:
a body,
a display having a cover glass extending over the edges of the display, wherein a touch sensitive area is configured to the display;
an adhesive configured to attach the display to the body from the cover glass portion,
a first conductive layer on the display configured to provide a reference voltage,
a second conductive layer on the body configured to provide a reference voltage,
a sensor layer configured to detect capacitance between the reference voltage and the sensor layer,
a first dielectric layer configured to provide a distance between the first conductive layer and the sensor layer,
a second dielectric layer configured to provide a distance between the second conductive layer and the sensor layer; wherein
at least one of the first dielectric layer and the second dielectric layer is made of compressible material configured to compress due to a force applied to the display; and
the force detecting element configured to transform the capacitance detected from the sensor layer to correspond to the force applied to the display.

3. A device according to claim 2, comprising a plurality of sensors at the sensor layer, wherein the at least one processor and the memory storing instructions cause, when executing the instructions, the device to detect the position of the force applied to the display.

4. A device according to claim 1, wherein the interface is configured to transfer information during the connection of the object and the force sensitive area.

5. A device according to claim 1, wherein the object is a stylus comprising a force measurement element.

6. A device according to claim 1, wherein the interface is a wireless interface.

7. A device according to claim 1, wherein the force sensitive area comprises a touch sensitive area.

8. A device according to claim 1, wherein the force sensitive area comprises a touch sensitive area, and the point of the object touching the touch sensitive area is configured to expand according to the force applied to the touch sensitive area and the touch sensitive area is configured to detect the area of the object touching the touch sensitive area, wherein the expansion is proportional to the force applied to the touch sensitive area.

9. A device according to claim 1, wherein the device is configured to transmit the force information detected from the force sensitive area to the object.

10. A system, comprising:
a device comprising a force sensitive area configured to detect a position of an object touching the force sensitive area and a force applied by the object touching the force sensitive area;
a stylus configured to touch the force sensitive area and to detect the force applied on the force sensitive area; wherein the stylus is configured to transmit the force information to the device; and
the device comprising a force detecting element configured to compare the force information received from the stylus and the force information detected from the force sensitive area;
wherein based on the comparison the force detecting element is configured to calibrate the force information detected from the force sensitive area.

11. A system according to claim 10, wherein the device comprises:
a body,
a display having a cover glass extending over the edges of the display, wherein a touch sensitive area is configured to the display;
an adhesive configured to attach the display to the body from the cover glass portion,
a first conductive layer on the display configured to provide a reference voltage,
a second conductive layer on the body configured to provide a reference voltage,
a sensor layer configured to detect capacitance between the reference voltage and the sensor layer,
a first dielectric layer configured to provide a distance between the first conductive layer and the sensor layer,
a second dielectric layer configured to provide a distance between the second conductive layer and the sensor layer; wherein
at least one of the first dielectric layer and the second dielectric layer is made of compressible material configured to compress due to a force applied to the display; and
the force detecting element configured to transform the capacitance detected from the sensor layer to correspond to the force applied to the display.

12. A system according to claim 11, wherein the force detecting element is configured to detect the position of the force applied to the display.

13. A system according to claim 10, wherein the stylus comprises a force measurement element.

14. A system according to claim 10, wherein the device and the stylus comprise a wireless interface to transmit and receive the force information.

15. A system according to claim 10, wherein the device is configured to transmit the force information detected from the force sensitive area to the stylus through the force sensitive area.

16. A system according to claim 10, wherein the force sensitive area comprises a touch sensitive area, and a point of the stylus touching the touch sensitive area is configured to expand according to the force applied to the touch sensitive area and the touch sensitive area is configured to detect the area of the object touching the touch sensitive area, wherein the expansion is proportional to the force applied to the touch sensitive area.

17. A system according to claim 10, wherein the device is configured to transmit the force information detected from the force sensitive area to the object.

18. A method for calibrating a force sensitive area of a device, the method comprising:
detecting, at the force sensitive area, a position of an object touching the force sensitive area and a force applied by the object touching the force sensitive area;
detecting, at the object, the force applied by the object touching the force sensitive area;
transmitting the force information from the object to the device;
comparing, at the device, the force information received from the object and the force information detected at the force sensitive area; and
calibrating the force information detected from the force sensitive area based on the force information received from the object in comparison to the force information detected at the force sensitive area, wherein the object is external to the force sensitive area.

19. A method according to claim 18, the device comprising:
a body,
a display having a cover glass extending over the edges of the display, wherein a touch sensitive area is configured to the display;
an adhesive attaching the display to the body from the cover glass portion,
a first conductive layer on the display providing a reference voltage,
a second conductive layer on the body providing a reference voltage,
a sensor layer detecting capacitance between the reference voltage and the sensor layer,
a first dielectric layer providing a distance between the first conductive layer and the sensor layer,
a second dielectric layer providing a distance between the second conductive layer and the sensor layer; wherein
applying a force to the display causing at least one of the first dielectric layer and the second dielectric layer compressing due to the force applied to the display; and
transforming the capacitance detected from the sensor layer to correspond to the force applied to the display.

20. A method according to claim 19, comprising detecting the position of the force applied to the display.

* * * * *